United States Patent [19]

Isshiki et al.

[11] Patent Number: 5,760,160
[45] Date of Patent: Jun. 2, 1998

[54] AROMATIC POLYCARBONATE RESIN GRANULE

[75] Inventors: Hideki Isshiki; Akiyoshi Manabe; Katsuhiro Kutsuna, all of Matsuyama, Japan

[73] Assignee: Teijin Chemicals Ltd., Tokyo, Japan

[21] Appl. No.: 810,800

[22] Filed: Mar. 7, 1997

Related U.S. Application Data

[63] Continuation-in-part of Ser. No. 436,230, filed as PCT/JP94/01539, Sep. 20, 1994.

[30] Foreign Application Priority Data

Sep. 21, 1993 [JP] Japan ................................. 5-234852

[51] Int. Cl.$^6$ .............................................. C08G 64/00
[52] U.S. Cl. ................................. 528/196; 528/198
[58] Field of Search ................................. 528/196, 198

[56] References Cited

U.S. PATENT DOCUMENTS

| | | | |
|---|---|---|---|
| 3,322,724 | 5/1967 | Schnell et al. | 528/196 |
| 3,427,370 | 2/1969 | Schnell et al. | 528/196 |
| 4,074,864 | 2/1978 | Narita et al. | 241/23 |
| 4,212,967 | 7/1980 | Govoni et al. | 528/500 |
| 4,603,194 | 7/1986 | Mendiratta et al. | 528/491 |
| 4,880,896 | 11/1989 | Otsubo et al. | 528/196 |

FOREIGN PATENT DOCUMENTS

| | | |
|---|---|---|
| 0116836 | 8/1984 | European Pat. Off. . |
| 0488190 | 6/1992 | European Pat. Off. . |
| 36-011231 | 7/1961 | Japan . |
| 36-021033 | 11/1961 | Japan . |
| 9875 | 4/1970 | Japan . |
| 41421 | 10/1972 | Japan . |
| 43752 | of 1973 | Japan . |
| 53-137297 | 11/1978 | Japan . |
| 60-202126 | 10/1985 | Japan . |
| 169605 | 7/1987 | Japan . |
| 63-035621 | 2/1988 | Japan . |
| 278929 | 11/1988 | Japan . |
| 5043678 | 2/1993 | Japan . |
| 873240 | 6/1959 | United Kingdom . |
| 8704637 | 8/1987 | WIPO . |

OTHER PUBLICATIONS

WPI Database, Derwent Publications Ltd., London, GB; AN 92-279688[34] & JP-A-04 189 834 (Teijin Chem. Ltd.) 8 Jul. 1992.
WPI Database, Derwent Publications Ltd., London, GB; AN 93-088739[11] & JP-A-05 032 793 (Teijin Chem. Ltd.) 9 Feb. 1993.
WPI Database, Derwent Publications Ltd., London, GB; AN 82-00943E[01] & JP-A-56 155 714 (Teijin Chem. Ltd.), 2 Dec. 1981.
WPI Database, Derwent Publications Ltd., London, GB; AN 93-0721193[09] & JP-A-05 017 584 (Teijin Chem. Ltd.), 26 Jan. 1993.

*Primary Examiner*—Terressa Mosley
*Attorney, Agent, or Firm*—Sherman and Shalloway

[57] ABSTRACT

An aromatic polycarbonate resin granule formed of an aggregate of fine powder particles, the granule having a specific surface area of 0.05 to 2.0 m$^2$/g, a bulk density of 0.3 to 0.8 g/ml, and an average particle diameter of 0.2 to 5 mm. At least 90% of the fine powder particles forming the granule have a particle diameter of 50 μm or less, and the content of a halogenated hydrocarbon as an organic solvent in the granule is 50 ppm or less in terms of a halogen amount. The polycarbonate granule is obtained by preparing a slurry or wet paste containing a polycarbonate, in which the amount of an organic solvent based on the total amount of the polycarbonate and the organic solvent is 10 to 65% by weight, and the amount of water based on the polycarbonate is at least 5% by weight. The above slurry or wet paste is subjected to a pulverization step to form the fine powder particles in which at least 90% have a particle diameter of 50 μm or less. The fine powder of the polycarbonate is treated to form an aggregate in which the amount of the organic solvent based on the total amount of the polycarbonate and the organic solvent is 10 to 65% by weight and the amount of water based on the polycarbonate is 5 to 20% by weight. The polycarbonate aggregate granule particles are subject to a drying step to obtain granules composed of the fine powder in which at least 90% retain a particle diameter of 50 μm or less and in which the content of the halogenated hydrocarbon as an organic solvent in the granule is 50 ppm or less in terms of halogen amount.

20 Claims, No Drawings

AROMATIC POLYCARBONATE RESIN GRANULE

This is a continuation-in-part of applicants' copending application Ser. No. 08/436,230, filed May 17, 1995 which received a filing date of Jun. 23, 1995, and which is the nationalization of PCT/JP94/01539 filed Sep. 20, 1994 which is based on Japanese priority application No. 5-234852, filed Sep. 21, 1993 to all of which applicants claim priority.

TECHNICAL FIELD

The present invention relates to an aromatic polycarbonate resin granule. More specifically, it relates to an aromatic polycarbonate resin granule of which the residual organic solvent content is very small, which, in particular, is suitable for a substrate for a recording medium and which has a uniform particle diameter so that it is excellent in handling properties.

TECHNICAL BACKGROUND

An aromatic polycarbonate resin is generally produced by a so-called solution method in which an alkali aqueous solution of dihydric phenol and phosgene are allowed to react in the presence of an organic solvent such as methylene chloride. The so-obtained aromatic polycarbonate resin is subjected to a drying step after a granulating step in which it is made into granule by removing the organic solvent from the organic solvent solution of the aromatic polycarbonate resin. As a method of obtaining the granule by removing the organic solvent from the organic solvent solution of the aromatic polycarbonate resin, there is known, for example, a method in which the organic solvent solution of the aromatic polycarbonate resin is brought into contact with hot water or steam to form a flake or a granule (Japanese Patent Publications Nos. 11231/1961, 9843/1965, 9875/1970 and 43752/1973, and Japanese Laid-open patent Publication No. 122393/1979) or a method in which the organic solvent solution of the aromatic polycarbonate resin is gelled by concentration or cooling to form a granule (Japanese Patent Publications Nos. 21033/1961, 22497/1963, 12379/1965, 9875/1970 and 41421/1972 and Japanese Laid-open Patent Publication 41048/1976). However, the granules (including flakes) obtained by these methods have a large residual organic solvent content, and it is difficult to fully remove the residual organic solvent by ordinary drying.

As a method of removing the above residual organic solvent, there has been proposed a method in which the organic solvent solution of the aromatic polycarbonate resin is distilled by mixing it with hot water having a temperature higher than the boiling point of the residual organic solvent. However, the granule obtained by the above method still contains the organic solvent in an amount of hundreds to thousands ppm. For further reducing the above residual organic solvent, it is required to dry the granule at a high temperature for a long period of time, or pelletize the granule with an extruder equipped with a vacuum-vent. Nevertheless, the organic solvent still remains in an amount of tens to hundreds ppm, and the so-obtained product is not free from its influences on heat resistance, hue and physical properties.

As a method of producing an aromatic polycarbonate resin granule of which the residual organic solvent is small, there is proposed a method in which the organic solvent solution of the aromatic polycarbonate resin obtained by the reaction, or a slurry of an aromatic polycarbonate resin having a residual organic solvent is treated with addition of a nonsolvent or a poor solvent, or a method in which the aromatic polycarbonate resin granule having a residual organic solvent is extracted with a poor solvent (Japanese Patent Publication No. 1298/1980, Japanese Laid-open Patent Publication No. 278929/1988 and Japanese Laid-open Patent Publication No. 6020/1989). In the above methods, the organic solvent is fully removed, but the nonsolvent or the poor solvent remains in a large amount, and it is difficult to fully remove the nonsolvent or the poor solvent by drying at a high temperature for a long period of time, not to mention by usual drying. Further, when the drying is strengthened as described above, not only the operation is complicated, but also the aromatic polycarbonate resin has a decreased molecular weight and a degraded hue and includes foreign matter.

As a method of producing an aromatic polycarbonate resin granule having a large bulk density and a uniform particle diameter, there is proposed a method in which a solid aromatic polycarbonate resin which is not dried is extruded with an extruder externally equipped with a die having a great number of fine orifices (Japanese Laid-open Patent Publication No. 169605/1987). However, this method has a problem in that the residual solvent content in the granule varies.

PROBLEMS TO BE SOLVED BY THE INVENTION

It is therefore a first object of the present invention to provide an aromatic polycarbonate resin granule of which the content of an organic solvent, particularly a halogenated hydrocarbon solvent, used for the production thereof, is very small.

It is a second object of the present invention to provide an aromatic polycarbonate resin granule formed of fine powder having a uniform particle diameter and excellent handling properties.

It is a third object of the present invention to provide an aromatic polycarbonate resin granule suitable as a substrate for optical information-recording media such as an optical disk.

MEANS TO SOLVE THE PROBLEMS

According to studies of the present inventors, it has been found that the above objects of the present invention can be is achieved by an aromatic polycarbonate resin granule, wherein (a) the granule is formed of a great number of particles of a fine powder, (b) the granule has a specific surface area of 0.05 to 2.0 $m^2/g$, (c) the granule has a bulk density of 0.4 to 0.8 g/ml, (d) the granule has a uniform size average particle diameter within the range of 0.2 to 5 mm, (e) at least 90% of the fine powder forming the granule have a particle diameter of 50 µm or less, and (f) the content of a halogenated hydrocarbon as an organic solvent in the granule is 50 ppm or less in terms of a halogen amount.

Further, according to studies of the present inventors, it has been found that the above aromatic polycarbonate resin granule can be obtained by a process for the production of an aromatic polycarbonate resin granule, which comprises the following steps a–d, (1) a step (a) of preparing a slurry or wet paste containing an aromatic polycarbonate resin, in which (i) the amount of an organic solvent based on the total amount of the aromatic polycarbonate resin and the organic solvent is 10 to 65% by weight, and (ii) the amount of water based on the aromatic polycarbonate resin is at least 5% by weight, (2) a step (b) finely by pulverizing the slurry or wet paste to form fine powder of the aromatic polycarbonate resin, of which at least 90% has a particle diameter of 50 μm or less, (3) a step (c) of applying pressure to the fine powder of the aromatic polycarbonate resin, formed in the above step, to form an aggregate in which (i) the amount of the organic solvent based on the total amount of the aromatic polycarbonate resin and the organic solvent is 10 to 65% by weight, and (ii) the amount of the water based on the aromatic polycarbonate resin is 5 to 120% by weight, and (4) a step (d) of pulverizing or cutting and drying the aggregate of the fine powder of the aromatic polycarbonate resin, formed in the above step, in any order.

The present invention will be more specifically explained.

The aromatic polycarbonate resin referred to in the present invention is a resin usually used as an engineering resin, and is an aromatic polycarbonate resin obtained by allowing a dihydric phenol and a carbonate precursor to react. The dihydric phenol used in the present invention is selected from dihydric phenols of the following general formula (1).

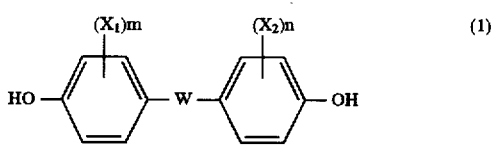

[wherein W is a substituted or unsubstituted alkylene group having 1 to 9 carbon atoms, an alkylidene group having 1 to 9 carbon atoms, a cycloalkylidene group having 1 to 9 carbon atoms, a single bond, —S—, —SO—, —SO$_2$—, —O— or —CO—, each of $X_1$ and $X_2$ is independently an alkyl group having 1 to 3 carbon atoms or a halogen atom, and each of m and n is independently 0, 1 or 2], and may be used alone or in combination. In particular, 2,2-bis(4-hydroxyphenyl)propane (generally called bisphenol A) is preferred. Examples of the dihydric phenol other than it include bis(4-hydroxyphenyl)methane, 1,1-bis(4-hydroxyphenyl)ethane, 1,1-bis(4-hydroxyphenyl)cyclohexane, 2,2-bis(4-hydroxy-3-methylphenyl)propane, bis(4-hydroxyphenyl)sulfone, bis(4-hydroxyphenyl)ether, and 4,4-dihydroxydiphenyl. Further, halogenated bisphenols such as 2,2-bis(3,5-dibromo-4-hydroxyphenyl)propane are included. The carbonate precursor includes carbonyl halides, diaryl carbonates and haloformates. Specifically, it includes phosgene, diphenyl carbonate and dihaloformate of a dihydric phenol.

For producing the aromatic polycarbonate resin by allowing the above dihydric phenol and the above carbonate precursor to react, the reaction may be conducted in the presence of a catalyst, a molecular weight adjuster and an antioxidant as required. The aromatic polycarbonate resin may be a branched polycarbonate resin obtained by copolymerizing polyfunctional aromatic compound(s) having at least three functional groups, or a mixture of at least two aromatic polycarbonate resins. The aromatic polycarbonate resin may have an optional molecular weight. For example, when the aromatic polycarbonate resin is obtained from bisphenol A as a dihydric phenol and phosgene as a carbonate precursor, the aromatic polycarbonate resin has a specific viscosity (ηsp), measured in a methylene chloride solution at a concentration of 0.7 g/dl at a temperature of 20° C., of preferably 0.015 to 3.0, particularly preferably 0.19 to 1.5.

The aromatic polycarbonate resin granule, provided by the present invention, is suitable for the granule from an aromatic polycarbonate resin obtained by a solution method using an organic solvent. That is, the present invention is suitable for a granule from an aromatic polycarbonate resin obtained by reacting the dihydric phenol and phosgene in the presence of an organic solvent. The organic solvent used in this case is a good solvent for an aromatic polycarbonate resin and is a solvent immiscible with water.

The above organic solvent may contain mainly at least one good solvent and, partially, a poor solvent and/or a nonsolvent. Concerning the terms "good solvent", "poor solvent" and "nonsolvent", the good solvent refers to a solvent which comes under "Good Solvent" or "Fair Solvent" in the classification in Table 3-1 "Polycarbonates" written by W. F. Christopher and D. W. Fox, 1962, pages 32 and 33, the poor solvent refers to a solvent which comes under "Poor Solvent", "Very Poor Solvent" or "Weak Solvent" in the above classification, and the nonsolvent refers to a solvent which comes under "Nonsolvent" in the above classification. Typical examples of the good solvent include halogenated hydrocarbons such as methylene chloride, tetrachloroethane and monochlorobenzene. Typical examples of the poor solvent include benzene, toluene and acetone. Typical examples of the nonsolvent include hexane and heptane. The above poor solvents and/or nonsolvents may be used alone or in combination of two or more.

An aromatic polycarbonate resin obtained by the above solution method contains not a little amount of a halogenated hydrocarbon solvent (e.g., methylene chloride) used at the step of its production.

The present invention is advantageously applied to an aromatic polycarbonate resin produced by the above solution method, while the aromatic polycarbonate resin may be that which is produced by other method so long as it contains a halogenated hydrocarbon.

In the process for the production of an aromatic polycarbonate resin granule, provided by the present invention, a slurry or wet paste containing an organic solvent and water, which satisfies the following (i) and (ii), is first prepared in the step (a). The above organic solvent refers to a good solvent for the aromatic polycarbonate resin as described above. The above slurry refers to that which is a slurry of the aromatic polycarbonate resin particles suspended in a mixed medium containing the organic solvent and water and is in a state having flowability. The above wet paste refers to that which contains a less amount of the mixed medium than the above slurry and is in a state having no flowability or less flowability.

(i) The amount of the organic solvent based on the total amount of the aromatic polycarbonate resin and the organic solvent is 10 to 65% by weight, and (ii) the amount of the water based on the aromatic polycarbonate resin is at least 5% by weight.

In the present specification, the "slurry or wet paste" in the above step a is sometimes referred to as "starting mixture".

In the step (a) in the present invention, as the starting mixture, being a slurry is generally more preferred than being a wet paste.

The above slurry is preferably a water slurry of an aromatic polycarbonate resin granule obtained in the granulating step of an organic solvent solution of an aromatic polycarbonate resin produced by the above solution method and containing a residual organic solvent of roughly pulverized gelation product.

The organic solvent content in the above starting mixture based on the aromatic polycarbonate resin is 10 to 65% by weight, preferably 15 to 40% by weight. When this organic solvent content is less than 10% by weight based on the total amount of the aromatic polycarbonate resin and the organic solvent, the load of power in the step (b), a finely pulverizing step, becomes large, it is difficult to obtain a fine powder having an intended size, and as a result, an aromatic polycarbonate resin granule of which the organic solvent content is very small can no longer be obtained. On the other hand, when the organic solvent content exceeds 65% by weight, undesirably, it is difficult to handle the aromatic polycarbonate resin as particles.

When the organic solvent content in a mixture containing particles of an aromatic polycarbonate resin (preliminary mixture) is not in a proper range in preparing the starting mixture for the step (a), it is sufficient to adjust the organic solvent content to the proper range by adding an organic solvent or removing the organic solvent. For example, when the organic solvent content is small, it is sufficient to add an organic solvent or an organic solvent solution of the aromatic polycarbonate resin to the above preliminary mixture in such an amount that the organic solvent content becomes a predetermined amount. On the other hand, when the organic solvent content in the preliminary mixture is too large, aromatic polycarbonate resin particles or a slurry or wet paste having a small organic solvent content may be added to the preliminary mixture. Further, the slurry having a large organic solvent content may be heated to remove an excess of the organic solvent.

The water content in the starting mixture in the step (a) is at least 5% by weight based on the aromatic polycarbonate resin. This water content is preferably in the range of from 5 to 2,000%, particularly preferably in the range of from 7 to 1,000% based on the aromatic polycarbonate resin.

When the water content in the starting mixture is less than 5% by weight, the step of finely pulverizing the aromatic polycarbonate resin cannot be carried out smoothly, and the finely pulverizing is difficult to conduct so that a granule of which the residual organic solvent content is small cannot be obtained. The upper limit of the water content differs depending upon a finely pulverizing apparatus, and cannot be absolutely determined. However, when the water content is extremely large, the finely pulverizing is sometimes difficult, and the large water content is disadvantageous in cost performance. Therefore, it is desirable to determine the water content after the operationability in the subsequent finely pulverizing step (b) and the adhesion of a finely pulverized resin fine powder are considered, while the water content based on the aromatic polycarbonate resin is preferably in the range of from 5 to 2,000% by weight, particularly preferably in the range of from 7 to 1,000% by weight. When the water amount is short, it is sufficient to add water or a resin slurry having a large water content, and it may be added at the time of finely pulverizing. When the water content is large in the above range, generally, the starting mixture is in the form of a slurry. On the other hand, when the water content is small in the above range, the starting mixture shows the form of a wet paste.

The size and particle size distribution of particles of the aromatic polycarbonate resin in the above starting mixture are not specially limited, and the size and particle size distribution are proper if the particles can be introduced to the finely pulverizing step. When it is difficult to introduce, it is proper to pulverize the particles. For example, a slurry formed from a reaction mixture obtained by the solution method may be used as it is. Generally, the size of the resin particles in the starting mixture is properly approximately 0.1 to 50 mm.

The starting mixture prepared in the above step (a) is introduced to the subsequent step (b), which is a finely pulverizing step, to finely pulverize the resin particles. This step (b) is a step in which the resin particles in the slurry or wet paste as the starting mixture are pulverized by exerting shear to form a fine powder having a particle diameter of 50 µm or less, and this operation is carried out with an apparatus having the function of finely pulverizing the resin particles as described above. The form of the apparatus is not specially limited. Desirably, there is used an apparatus having the function of pulverizing the resin particles so that at least 90%, particularly at least 95%, of the resultant fine powder have a particle diameter of 50 µm or less, preferably a particle diameter of 40 µm or less, particularly preferably a particle diameter of 30 µm or less. The lower limit of the fine particles obtained by the pulverizing is not limited, while it is generally about 0.3 µm.

The apparatus having the pulverizing function used in the step (b) is preferably an apparatus of an extruder form since the continuous operation can be carried out and since the intended homogeneous resin fine powder can be obtained.

The apparatus type and operation of an extruder in the case where the step (b) is carried out with the apparatus of an extruder form will be explained below. The type of the extruder includes a single screw or multiple screw extruder, a plunger extruder and an extruder having an inner screw and having an injection molding machine-like function.

Of these, it is preferred to use a twin-screw extruder. The use of an extruder is industrially advantageous since the step (a) and the step (b) can be carried out therein in series and since the subsequent step (c) can be also carried out without a break. When a vented extruder is used, the step (a) and the step (b) can be simultaneously carried out by feeding water through a vent hole.

When the step (b) is carried out with an extruder, an increase in the internal pressure due to an increase in the internal temperature in the cylinder may cause troubles such as fusing or melting of the resin in some cases dependent upon the concentration of the aromatic polycarbonate resin and operation conditions. For avoiding these troubles, it is preferred to use a cylinder with a jacket having a temperature-adjusting mechanism and/or a screw with a jacket having a temperature-adjusting mechanism. Further, the extruder may be provided with a screw having a compressing portion.

Further, the cylinder of the extruder may be provided with a punched plate or slit all the way or partly along the length of the cylinder for exhausting water. Further, it may be provided with a water-exhausting mechanism on a gland side. When the water content in the starting mixture is a large excess, most of it is separated on the side opposite to the extrusion direction, or separated by the above punched plate or slit. In this case, although not specially limited, the holes of the gland and the punched plate and the slit clearance can be properly selected depending upon the particle diameter of the resin particles.

In the present invention, when the step (c) is carried out using an extruder, the fine powder of the resin finely pulverized in the above step (b) is extruded while pressurized. The extruded granule is an aggregate of the fine powder (this granule is referred to as "aggregate" hereinafter). The step (c) is carried out by pressuring the fine powder to form the aggregate, and in the step (c), the amount of the organic solvent based on the total amount of the aromatic polycarbonate resin and the organic solvent is adjusted to a range of 10 to 65% by weight, preferably 15 to 40% by weight, and further the amount of water based on the aromatic polycarbonate resin is adjusted to a range of 5 to 120% by weight, preferably 7 to 70% by weight. The pressure in the step (c) is a pressure under which particles of the fine powder partially bond to one another to form a block of an aggregate. When an electron microscopic photograph of a cross section of a piece prepared by breaking the aggregate is taken, the size of the fine powder particles forming the aggregate can be easily visually found on its photograph at a magnification of about 1,000 diameters.

The step (c) is preferably carried out at a temperature at which at least 90% of the fine powder of the aromatic polycarbonate resin retains a particle diameter of 50 μm or less. This temperature differs depending upon the pressure and the amount of the organic solvent, and cannot be definitely determined. When the temperature is high, however, the amount of the fine powder which can retain a particle diameter of 50 μm or less is smaller than 90% due to the swelling and melting of the fine powder or the softening and melting thereof, and particles of the fine powder mutually intimately bond to one another to form a continuous layer, so that the aromatic polycarbonate resin granule of which the residual organic solvent content is very small, which is an object of the present invention, can be no longer obtained.

Advantageously, the pressurizing in the step (c) is carried out continuously in the extruder subsequently to the step (b). It is particularly preferred to employ a method in which an extruder provided with a die having narrow holes or slits in an outlet of the extruder is used, and as the fine powder prepared by fine pulverizing in the extruder moves toward the outlet of the extruder, it is gradually pressurized, to form an aggregate, and the aggregate is extruded through the narrow holes or the slits.

In the step (c), it is not necessary to particularly adjust the organic solvent content, and the organic solvent content may be the organic solvent content in the fine powder obtained in the step (b). That is, the organic solvent content based on the total amount of the aromatic polycarbonate resin and the organic solvent is in the range of from 10 to 65% by weight, preferably 15 to 40% by weight. When the fine powder has an organic solvent content in the above range, the aggregate has proper form-retainability. When the organic solvent is less than 10% by weight, the aggregate is fragile. When it exceeds 65% by weight, it is no longer possible to retain an intended fine powder.

The water content in the step (c) is in the range of from 5 to 120% by weight, preferably 7 to 70% by weight, based on the aromatic polycarbonate resin. When the water content is less than 5% by weight, the form of the fine powder is destroyed when the fine powder is extruded, and the aggregate is no longer obtained. When it is more than 120% by weight, the aggregate is fragile.

When the fine powder of the finely pulverized aromatic polycarbonate resin is extruded to form the aggregate, the outlet of an extruder is provided with a die having narrow holes or slits, and the extrudate of the aggregate of the aromatic polycarbonate resin in the form of strands or ribbons is cut to an intended length, whereby there is obtained an aggregate of the aromatic polycarbonate resin having excellent drying properties and having uniform particle diameters. The die is selected from a front-extrusion type die for extruding a resin in the same direction as that of an extrusion axis and a transverse-extrusion type die for extruding a resin in the direction at right angles with, or in parallel with, the extrusion axis. Although not specially limited, the form of the holes of the die is generally circular in view of the manufacturing easiness of the hole. In the structure of the holes of the die, the proper diameter of each hole is 0.1 to 5 mm, preferably 0.5 to 3 mm in view of extrusion capability, drying efficiency and handling property. Concerning a land, holes having the same diameter may be provided through the die, or the holes may be multi-stage through holes which are provided through the same hole axis and have different diameters. In view of the strength of the aggregate to be obtained, the extrusion pressure and the strength of the die, the ratio of the land length (L) to the hole diameter (D) is preferably L/D=1–15. When a die having multi-stage through holes is used, the diameter and land length of a greater hole are about such sizes that the extrusion is not hampered.

In the present invention, the aggregate obtained in the above step (c) is pulverized or cut, and dried (step (d)). In the step (d), the aggregate is pulverized or cut, and dried, and the order of these operations may be optional, while it is generally preferred to carry out the drying after the pulverizing or cutting. The drying in the step (d) means that both the organic solvent and water contained in the aggregate are removed.

The specific method in the step (d) will be explained. The aggregate of fine powder of the aromatic polycarbonate resin in the form of strands or ribbons, extruded through the die, can be cut by any method. In a preferred embodiment, the aggregate is cut by rotating a propeller mounted to be in parallel with the die surface. The length of the aggregate can be adjusted on the basis of a position where the propeller is mounted and the rotation rate of the propeller.

It is not necessary to remove liquids from the obtained aggregate of the aromatic polycarbonate resin, and it can be dried continuously and/or batchwise. The aggregate may be dried in a drying step alone. Or, the aggregate may be dried, as required, after carrying out any one of organic solvent removing treatments such as a method in which it is mixed with a liquid having a boiling point higher than that of the residual organic solvent and then distilled and a method in which the aggregate is brought Into contact with steam. By the method of bringing the aggregate into contact with steam, the final residual organic solvent content can be further decreased. When the aggregate of the aromatic polycarbonate resin is fragile since the residual organic solvent content in the aggregate is large, it is preferred to dry the aggregate with an apparatus which is free from exerting shear, such as a hot air circulation-type dryer, a steam tube dryer, a Powheater, a hopper dryer or a tower dryer, or to preliminarily dry the aggregate with the above apparatus and then further dry it with a drying apparatus such as a paddle dryer or a multi-fin dryer. In particular, when the aggregate is dried at a temperature higher than its glass transition temperature (Tg), it is preferred to use an apparatus which is free from exerting shear.

In the present invention, for facilitating the removal of the organic solvent, a nonsolvent for a polycarbonate resin may be added to the aggregate of the aromatic polycarbonate resin obtained by pulverizing or cutting the aggregate of the fine powder. Although differing depending upon the kind of the organic solvent, the amount of the nonsolvent based on the polycarbonate resin is at least 0.1% by weight, preferably 1 to 400% by weight. When this amount is larger than 400% by weight, undesirably, the cost for the recovery by distillation and separation increases. When the nonsolvent is added, the nonsolvent may contain a small amount of a good solvent and/or a poor solvent. Further, the nonsolvent may be preliminarily contained in the starting mixture.

The aggregate in the form of a polycarbonate resin granule, obtained by pulverizing or cutting, contains a residual good solvent, which has been allowed to be present at the step of finely pulverizing in the extruder. When a predetermined amount of the nonsolvent is incorporated into the above polycarbonate resin aggregate, the nonsolvent penetrates the aggregate, whereby there can be obtained the aggregate of which the residual good solvent content is remarkably decreased.

While the residual good solvent content can be remarkably decreased by using the above nonsolvent, the amount of the residual nonsolvent generally increases. According to the present invention, however, not only the amount of the residual good solvent but also the amount of the residual nonsolvent can be remarkably decreased. As the above nonsolvent, typically preferred example is hexane or heptane.

In the process for the production of an aromatic polycarbonate resin granule, provided by the present invention, it is industrially advantageous to carry out the steps (a), (b) and (c) in one extruder, preferably a twin screw extruder, continuously. And, it is desirable to obtain the aromatic polycarbonate resin in the form of particles having a uniform size by extruding the aggregate through narrow holes provided in the outlet portion of the extruder and then cutting the extrudate.

Further, the drying in the step (d) is generally carried out at a temperature equal to, or lower than, the Tg of the aromatic polycarbonate resin, or at a temperature of 140° C. or lower. However, in the case where the particulate aggregate is obtained by extruding the aggregate through a die in particular and cutting the extrudate, it is preferred to carry out the drying at a temperature between Tg and the melting point of the aromatic polycarbonate resin, more preferably at a temperature not exceeding [Tg+40° C.], particularly preferably at a temperature between 145° C. and 180° C.

When the so-obtained dry aggregate or preliminarily dried aggregate is further subjected to extraction treatment with a poor solvent, the amount of the residual good solvent and the content of an oligomer (generally up to a pentamer) can be greatly decreased. Acetone is particularly preferably used as the above poor solvent.

Any stabilizer, any additive and any filler may be incorporated to the so-obtained polycarbonate resin aggregate as required at any stage.

According to the above process for the production of a resin granule, provided by the present invention, there is provided the aromatic polycarbonate resin granule of which the residual organic solvent content, particularly, the residual halogenated hydrocarbon solvent content, is very small, which is suitable for a substrate for a recording medium and which has a very uniform particle diameter and is excellent in handling properties. This resin granule is novel and is characterized by the following (a) to (f).

(a) The granule is formed of a great number of particles of a fine powder, (b) the granule has a specific surface area of 0.05 to 2.0 $m^2/g$, (c) the granule has a bulk density of 0.4 to 0.8 g/ml, (d) the granule has an average particle diameter of 0.2 to 5 mm, (e) at least 90% of the fine powder have a particle diameter of 50 μm or less, and (f) the content of a halogenated hydrocarbon as an organic solvent is 50 ppm or less in terms of a halogen amount.

The resin granule of the present invention is preferably produced by a solution method, and one characteristic feature thereof is that the content of a halogenated hydrocarbon used as a solvent for the production thereof is very small. In a conventional resin produced by a solution method, it is industrially very difficult to decrease the content of the halogenated hydrocarbon solvent since the halogenated hydrocarbon solvent is a good solvent, and the conventional resin inevitably contains the halogenated hydrocarbon solvent in an amount of the order of hundreds ppm in terms of a halogen amount.

According to the present invention, however, there can be provided a resin of which the halogenated hydrocarbon content as a halogen amount is very small, as small as 50 ppm or less, preferably 40 ppm or less, more preferably 30 ppm or less.

According to the present invention, the content of other halogenated hydrocarbon such as carbon tetrachloride included in phosgene or the organic solvent used for the production of an aromatic polycarbonate resin can be also greatly decreased. In the present invention, therefore, the halogenated hydrocarbon content of 50 ppm or less means a value including the amount of the above halogenated hydrocarbon included.

The resin granule of the present invention is an aggregate of a great number of fine powder, and has a specific surface area in the range of from 0.05 to 2.0 $m^2/g$, preferably from 0.07 to 2.0 $m^2/g$, and a bulk density in the range of from 0.4 to 0.8 g/ml, preferably from 0.45 to 0.75 g/ml, most preferably from 0.45 to 0.70 g/ml. Further, the above aggregate has an average particle diameter of 0.2 to 5 mm, preferably 0.4 to 4 mm. The above aggregate has its characteristic feature in that fine powder particles forming it are very small and uniform in size, and at least 90%, preferably at least 95%, of the fine powder have a particle diameter of 50 μm or less, preferably 40 μm or less, particularly preferably 30 μm or less.

Further, the resin aggregate properly has a major length/minor length ratio (aspect ratio) of 1–10, preferably 1–8.

The diameter size of the fine powder particle forming the above aggregate can be easily measured by breaking the aggregate into two or more, and taking a photograph of its magnified cross section through an electron microscope at a magnification of about 1,000 diameters. The size of the finely pulverized resin particles can be also found by this method.

As stated above, the resin granule of the present invention is an aggregate of a great number of fine powders, and is characterized in that it has the above-mentioned specific surface area and bulk density. It has further a fixed angle of repose. That is, the resin granule of the present invention has an angle of repose of 10° to 34°. The granule having this range of the angle of repose is easy to handle and advantageous to obtain a molded article. The angle of repose of the resin granule in the present invention is preferably between 13° and 33°, most preferably between 13° and 25°.

EXAMPLES

The present invention will be further explained hereinafter with reference with Examples, in which "%" stands for "% by weight", the content of methylene chloride is a weight percent based on the total amount of the methylene chloride and an aromatic polycarbonate resin, the water content is a weight percent based on an aromatic polycarbonate resin, the concentration of a granule in a slurry is a weight percent of an aromatic polycarbonate resin based on the slurry, and evaluations were carried out according to the following methods.

(a) Methylene chloride content: A sample was analyzed for a chlorine content with a chlorine analyzer (TSX, supplied by Mitsubishi Kasei Corporation), and the chlorine content was converted to a methylene chloride content. A parenthesized value shows a chlorine content.

(b) n-Heptane content, carbon tetrachloride content and methylene chloride content in copolymer: Measured by gas column chromatography (model 263, supplied by Hitachi Ltd.) using polyethylene glycol as a column filler.

(c) Specific viscosity ($\eta_{sp}$) 0.7 Gram of an aromatic polycarbonate resin was dissolved in 100 ml of a methylene chloride solution, and measured with Ostwald's viscometer at 20° C.

(d) Specific surface area ($m^2/g$): Measured with a specific surface area measuring apparatus (GEMINI 2360 model, supplied by Micromeritics) using nitrogen as adsorbent gas under the conditions of an adsorption equilibrium attaining time of 30 seconds and an equilibrium relative pressure of 0.05 to 0.35, by a BET six point method.

(e) Melting point and glass transition temperature: Measured with a differential scanning calorimeter (910, supplied by E. I. du Pont de Nemours & Co.).

(f) Angle of repose:

It was measured according to "Surface active agents— Powders and granules—Measurement of the angle of repose" of ISO (International Standard) 4324-1977 (E).

Example 1

(A) A methylene chloride solution containing 15% of an aromatic polycarbonate resin having a specific viscosity of 0.426, obtained from bisphenol A and phosgene by a conventional method, was charged into a kneader charged with warm water kept at 42° C., to remove methylene chloride, whereby a water slurry having a granule concentration of 50% and a liquid temperature of 38° C. was obtained. Particles in the slurry had a methylene chloride content of 25%.

(B) A single screw extruder equipped internally with a screw having a diameter of 40 mm, an L/D of 9.25, no compression portion, a distance of 2 cm from the screw top to a die and a groove depth of 6 mm, and having a jacket for temperature adjustment, was provided with a die having 82 holes having a diameter of 2 mm each and a land of 5 mm in the outlet of the extruder. A cutter (one-blade propeller having a length of 50 mm) was spaced 4 mm away from the front surface of the die, the jacket temperature was set at 15° C., the screw rotation was set at 20 rpm, and the cutting machine rotation was set at 80 rpm.

The slurry obtained in the above (A) was continuously fed to the hopper of the above extruder, dehydrated and finely pulverized in the extruder, and extruded to give a particulate aggregate. The feed rate of the slurry was 2.6 kg/hour, the amount of water separated to the screw gland side was 0.68 liter/hour, the extrusion amount was 1.8 kg/hour, and the particulate aggregate had a water content of 14% and a methylene chloride content of 20%. When the above operation was carried out for about 2 hours, the operation was free from any troubles such as bridging in the hopper. The so-obtained particulate aggregate was continuously fed to hot water maintained at 90° C. with stirring, allowed to reside for 15 minutes to remove the organic solvent, then drawn, centrifugally dehydrated, and dried with a hot air circulation-type dryer at 145° C. (glass transition point 147° C.) for 6 hours, to give a particulate aggregate of the aromatic polycarbonate resin having a residual methylene chloride content of 4.5 ppm (chlorine content 3.8 ppm), a bulk density of 0.58 g/ml, a major length/minor length ratio of 2 and a specific surface area of 0.21 $m^2/g$, in which at least about 95% of the particulate aggregate passed through 8 mesh and all the particulate aggregate remained on 14 mesh. The particulate aggregate had on angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 20 μm.

Example 2

The same particulate aggregate having a water content of 14% and a methylene chloride content of 20% as that obtained in Example 1 was dried with a hot air circulation-type dryer at 145° C. for 6 hours to give a particulate aggregate of the aromatic polycarbonate resin having a residual methylene chloride content of 4.0 ppm (chlorine content 3.3 ppm), a bulk density of 0.57 g/ml, a major length/minor length ratio of 2 and a specific surface area of 0.22 $m^2/g$, in which at least about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 20 μm.

Example 3

A water slurry having a granule concentration of 50% and a methylene chloride content of 20% was obtained in the same manner as in Example 1(A) except that a solution prepared by mixing the methylene chloride solution containing 15% of an aromatic polycarbonate resin used in Example 1(A) with 10%, based on the methylene chloride solution, of n-heptane. The slurry was continuously fed to the hopper of the same extruder as that used in Example 1(B), dehydrated and finely pulverized in the extruder, and extruded. The feed rate of the slurry was 2 kg/hour, the amount of water separated to the screw gland side was 0.63 liter/hour, the extrusion amount was 1.31 kg/hour, and the resultant particulate aggregate had a water content of 12% and a methylene chloride content of 16%. The organic solvent was removed from the so-obtained particulate aggregate, and the particulate aggregate was centrifugally dehydrated and dried, in the same manner as in Example 1, to give a particulate aggregate of the aromatic polycarbonate resin having a residual methylene chloride content of 0.8 ppm (chlorine content 0.7 ppm), a residual n-heptane content of 80 ppm, a bulk density of 0.57 g/ml, a major length/minor length ratio of 2 and a specific surface area of 0.83 $m^2/g$, in which at least about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 95% had a diameter of 2 to 20 μm.

Example 4

A particulate aggregate was obtained by carrying out dehydration and finely pulverizing in an extruder and extrusion in the same manner as in Example 1 except that the extruder was provided with a compression portion having a compression ratio of 1.66 in a front portion of the screw. The feed rate of the slurry was 2.6 kg/hour, the amount of water separated to the screw gland side was 0.72 liter/hour, the extrusion amount was 1.7 kg/hour, and the resultant particulate aggregate had a water content of 11% and a methylene chloride content of 18%. The organic solvent was removed from the so-obtained particulate aggregate, and the particulate aggregate was centrifugally dehydrated and dried, in the same manner as in Example 1, to give a particulate aggregate of the aromatic polycarbonate resin having a residual methylene chloride content of 3.7 ppm (chlorine content 3.1 ppm), a bulk density of 0.59 g/ml, a major length/minor length ratio of 2 and a specific surface area of 0.24 m$^2$/g, in which at least about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 20 µm.

Example 5

(C) A twin screw extruder having a cylinder provided with a Jacket for temperature adjustment and having twin screws having a diameter of 30 mm and an L/D of 25 (PCM-30, supplied by Ikegai Corp.) was provided with a die having 120 holes having a diameter of 2 mm each and a land of 6 mm in the outlet of the extruder and a cutter (one-blade propeller having a length of 50 mm) spaced 4 mm away from the front surface of the die. The screw central portion was provided with a kneading disk, and was provided with a slit having a clearance of 0.5 mm on a feed side from the kneading disk, the jacket temperature was set at 15° C., the screw rotation was set at 80 rpm, and the cutter rotation was set at 200 rpm.

The same slurry as that obtained in Example 1(A) was continuously fed to the hopper of the extruder, dehydrated and finely pulverized in the extruder and extruded to give a particulate aggregate. The feed rate of the slurry was 70 kg/hour, the extrusion amount was 47.9 kg/hour, and the amount of water separated through the slit was 18.1 kg/hour. The so-obtained particulate aggregate had a water content of 15% and a methylene chloride content of 18%. The organic solvent was removed from the particulate aggregate, and the particulate aggregate was centrifugally dehydrated and dried, in the same manner as in Example 1, to give a particulate aggregate of the aromatic polycarbonate resin having a residual methylene chloride content of 3.8 ppm (chlorine content 3.2 ppm), a residual carbon tetrachloride content of 1 ppm, a bulk density of 0.57 g/ml, a major length/minor length ratio of 2 and a specific surface area of 0.18 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 30 µm.

Example 6

An aggregate obtained in the same manner as in Example 5 except that the die and the cutting machine were removed, was pulverized with a hammer mill equipped with a screen having an opening of 5 mm to give an particulate aggregate having a water content of 20% and a methylene chloride content of 20%. The organic solvent was removed from the particulate aggregate, and the particulate aggregate was centrifugally dehydrated and dried, in the same manner as in Example 1, to give a particulate aggregate of the aromatic polycarbonate resin having a residual methylene chloride content of 1.8 ppm (chlorine content 1.5 ppm), a bulk density of 0.63 g/ml and a specific surface area of 0.63 m$^2$/g, in which about 80% of the particulate aggregate passed through 6 mesh and all the particulate aggregate remained on 35 mesh. The particulate aggregate had an angle of repose of 34°. An aggregate particle was broken, and an electron microscopic photograph of the cross section thereof was taken at a magnification of 1,000 diameters to show that it was an aggregate formed of a fine powder of which at least 95% had a diameter of 2 to 20 µm.

Example 7

An aggregate obtained in the same manner as in Example 5 except that the die and the cutter were removed, was continuously fed to the same twin screw extruder as that used in Example 5 (C) except that the kneading disk in the screw central portion was removed, to give a particulate aggregate. The organic solvent was removed from the particulate aggregate, and the particulate aggregate was centrifugally dehydrated and dried, in the same manner as in Example 1, to give a particulate aggregate of the aromatic polycarbonate resin having a residual methylene chloride content of 3.3 ppm (chlorine content 2.8 ppm), a bulk density of 0.57 g/ml, a major length/minor length ratio of 2 and a specific surface area of 0.22 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 20 µm.

Example 8

A particulate aggregate of an aromatic polycarbonate resin was obtained in the same manner as in Example 5 except that the same twin screw extruder as that used in Example 5(C) was provided with a die having 55 holes having a diameter of 3 mm each and a land of 6 mm in the outlet of the extruder and that a cutter (one-blade propeller having a length of 50 mm) was spaced 5 mm away from the front surface of the die. The particulate aggregate had a residual methylene chloride content of 2.8 ppm (chlorine content 2.3 ppm), a bulk density of 0.53 g/ml, a major length/minor length ratio of 1.6 and a specific surface area of 0.38 m$^2$/g, in which about 95% of the particulate aggregate passed through 5 mesh and all the particulate aggregate remained on 14 mesh. The particulate aggregate had an angle of repose of 14°. An aggregate particle was broken, and an electron microscopic photograph of the cross section thereof was taken at a magnification of 1,000 diameters to show that it was an aggregate formed of a fine powder of which at least 90% had a diameter of 2 to 20 µm.

Example 9

A particulate aggregate of an aromatic polycarbonate resin was obtained in the same manner as in Example 5 except that the same twin screw extruder as that used in Example 5(C) was provided with a die having 220 holes having a diameter of 1.5 mm each and a land of 6 mm in the outlet of the extruder and that a cutter (one-blade propeller having a length of 50 mm) was spaced 5 mm away from the front surface of the die. The particulate aggregate had a residual methylene chloride content of 3.6 ppm (chlorine content 30 ppm), a bulk density of 0.59 g/ml, a major length/minor length ratio of 3.3 and a specific surface area of 0.20 m$^2$/g, in which about 95% of the particulate aggregate passed through 8 mesh and all the particulate aggregate remained on 20 mesh. The particulate aggregate had an angle of repose of 20°. An aggregate particle was broken, and an electron microscopic photograph of the cross section thereof was taken at a magnification of 1,000 diameters to show that it was an aggregate formed of a fine powder of which at least 90% had a diameter of 2 to 30 μm.

Example 10

The same particulate aggregate having a water content of 15% and a methylene chloride content of 18% as that obtained in Example 5 was charged into warm water maintained at 35° C. to give a water slurry having a granule concentration of 20%. n-Heptane in an amount of 20% based on the aromatic polycarbonate resin was added to the above slurry with stirring, and the n-heptane and the slurry were mixed for 20 minutes. Then, the mixture was temperature-increased to 95° C. with stirring, and maintained for 30 minutes to give a water slurry having a granule concentration of 20% and a methylene chloride content of 0.2%. This slurry was centrifugally dehydrated, and dried with a hot air circulating dryer at 145° C. for 6 hours to give an aggregate of the aromatic polycarbonate resin having a residual methylene chloride content of 0.4 ppm (chlorine content 0.3 ppm), a residual carbon tetrachloride content of 0.1 ppm, a residual n-heptane content of 90 ppm, a bulk density of 0.57 g/ml, a major length/minor length ratio of 2 and a specific surface area of 0.18 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 30 μm.

Example 11

A particulate aggregate of an aromatic polycarbonate resin was obtained in the same manner as in Example 10 except that the drying with the hot air circulation-type dryer was changed to drying at 155° C. for 4 hours. The particulate aggregate had a residual methylene chloride content of 0.07 ppm (chlorine content 0.06 ppm), a residual n-heptane content of 30 ppm, a bulk density of 0.57 g/ml, a major length/minor length ratio of 2 and a specific surface area of 0.18 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 30 μm.

Example 12

The same slurry as that obtained in Example 1(A) was continuously recharged into a stirring vessel at a rate of 60 kg/hour, and a methylene chloride solution of an aromatic polycarbonate resin was added at 15 kg/hour with stirring, to give a water slurry having a granule concentration of 43% and a methylene chloride content of 41%. This slurry was treated in the same manner as in Example 5 to give a particulate aggregate of the aromatic polycarbonate resin having a residual methylene chloride content of 4.8 ppm (chlorine content 4.0 ppm), a bulk density of 0.58 g/ml, a major length/minor length ratio of 2 and a specific surface area of 0.12 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 30 μm.

Example 13

(E) A water slurry having a granule concentration of 50% and a liquid temperature of 70° C. was obtained in the same manner as in Example 1(A) except that the water temperature of the kneader was changed to 80° C. The granule in the slurry had a methylene chloride content of 8%.

The above slurry was continuously fed to the hopper of the same twin screw extruder as that used in Example 5(C), and at the same time, the same methylene chloride solution of an aromatic polycarbonate resin as that used in Example 1(A) was continuously charged into a portion below the hopper (within a block where the hopper was mounted). The mixture was finely pulverized in the extruder, and extruded to give a particulate aggregate. The feed amount of the slurry was 60 kg/hour, the charge amount of the methylene chloride solution was 10 kg/hour, and the extrusion amount was 44.7 kg/hour. In this case, the total resin amount was 31.5 kg/hour, and the methylene chloride amount was 26.1%. The so-obtained particulate aggregate had a water content of 12% and a methylene chloride content of 23%. The organic solvent was removed from the particulate aggregate, and the particulate aggregate was centrifugally dehydrated and dried, in the same manner as in Example 1, to give a particulate aggregate of the aromatic polycarbonate resin having a residual methylene chloride content of 3.5 ppm (chlorine content 2.9 ppm), a bulk density of 0.57 g/ml, a major length/minor length ratio of 2 and a specific surface area of 0.19 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 30 μm.

Example 14

The same slurry as that obtained in Example 13(E) was centrifugally dehydrated to give a wet paste having a methylene chloride content of 8% and a water content of 13%. This wet paste was extruded with the same extruder as that used in Example 13 to give a particulate aggregate. The feed amount of the wet paste was 30.4 kg/hour, the charge amount of the methylene chloride solution of an aromatic polycarbonate resin was 15 kg/hour, and the extrusion amount was 41.7 kg/hour. In this case, the total resin amount was 27.3 kg/hour, and the methylene chloride amount was 35.4%. The so-obtained particulate aggregate had a water content of 10% and a methylene chloride content of 30%. The organic solvent was removed from the particulate aggregate, and the particulate aggregate was centrifugally dehydrated and dried, in the same manner as in Example 1, to give a particulate aggregate of the aromatic polycarbonate resin having a residual methylene chloride content of 3.8 ppm (chlorine content 3.2 ppm), a bulk density of 0.57 g/ml, a major length/minor length ratio of 2 and a specific surface area of 0.17 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 30 μm.

Example 15

(F) A tower dryer having an internal volume of 220 liters, a straight cylinder portion diameter of 40 cm and a height of 180 cm and having a 70-degree tilted porous plate for blowing in hot air and/or steam was installed.

The same particulate aggregate as that obtained by extruding, removing the organic solvent and centrifugally drying in Example 13, was continuously dried with a paddle dryer for 2 hours, and further dried with the tower dryer for 2 hours. The thermometer inserted below the center of the paddle dryer showed a temperature of 150° C., the hot air amount in the tower dryer was 60 m$^3$/hour, and the thermometer inserted in the central portion of the tower showed a temperature of 165° C. The resultant particulate aggregate was a particulate aggregate of the aromatic polycarbonate resin having a residual methylene chloride content of 1.0 ppm (chlorine content 0.8 ppm), a bulk density of 0.57 g/ml, a major length/minor length ratio of 2 and a specific surface area of 0.19 m$^2$/g, in which about 95% of the particulate aggregate passed through 8 mesh and all the particulate aggregate remained on 14 mesh. The particulate aggregate had an angle of repose of 18°. An aggregate particle was broken, and an electron microscopic photograph of the cross section thereof was taken at a magnification of 1,000 diameters to show that it was an aggregate formed of a fine powder of which at least 90% had a diameter of 2 to 30 μm.

Example 16

(G) The same methylene chloride solution of an aromatic polycarbonate resin as that used in Example 1(A) was dropwise added to a stirring vessel storing hot water at 45° C., with stirring, and the mixture was treated with a wet method pulverizing machine. Then, the methylene chloride was removed while the mixture was circulated to the stirring vessel, to give a water slurry having a granule concentration of 20% and a methylene chloride content of 20%.

The above slurry was continuously fed to the same extruder as that used in Example 5(C), finely pulverized in the extruder, and extruded to give a particulate aggregate. The feed amount of the slurry was 100 kg/hour, the extrusion amount was 26.5 kg/hour, and the amount of water separated through the slit was 72.6 kg/hour. The resultant particulate aggregate had a water content of 12% and a methylene chloride content of 17%. The so-obtained particulate aggregate was continuously fed to a tower dryer of the same type as that in Example 15(F) having a 3 kg/cm$^2$ steam blow-in inlet provided in a lower portion, through the top portion of the tower dryer, and after a residence time of 30 minutes, the particulate aggregate was drawn from the bottom portion thereof. In this case, the steam amount was 300 g/minute and 220% based the methylene chloride amount. The drawn particulate aggregate was moved onto a metal net, and air was blown thereto at a rate of 20 liters/minute for 5 minutes. The resultant particulate aggregate had a water content of 5% and a methylene chloride content of 0.5%. This particulate aggregate was continuously fed to the same tower dryer as that used in Example 15(F) through its top portion, and after a residence time of 4 hours, the particulate aggregate was drawn from its bottom portion. The hot air amount was 60 m$^3$/hour, and the thermometer inserted in the central portion of the tower showed a temperature of 165° C. The so-obtained particulate aggregate was a particulate aggregate of the aromatic polycarbonate resin having a residual methylene chloride content of 0.7 ppm (chlorine content 0.6 ppm), a residual carbon tetrachloride content of 0.4 ppm, a bulk density of 0.55 g/ml, a major length/minor length ratio of 2 and a specific surface area of 0.20 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 30 μm.

Example 17

To the same water slurry as that obtained in Example 16(G) was added, while stirring, n-heptane in an amount of 10% based on the aromatic polycarbonate resin, and the slurry and the n-heptane were mixed for 20 minutes. The mixture was temperature-increased to 95° C. with stirring, and maintained for 30 minutes to give a water slurry having a granule concentration of 20% and a methylene chloride content of 0.5%. While this slurry was continuously fed to the same twin screw extruder as that used in Example 5(C), a solution prepared by mixing the same methylene chloride solution of an aromatic polycarbonate resin as that used in Example 1(A) with 10%, based on this solution, of n-heptane, was continuously charged through a vent hole (a block installed with the kneading disk) provided in the central portion of the cylinder. The mixture was finely pulverized in the extruder, and extruded to give a particulate aggregate. The slurry feed amount was 100 kg/hour, the charge amount of the methylene chloride solution containing n-heptane was 6.76 kg/hour, and the extrusion amount was 28 kg/hour. In this case, the total resin amount was 20.9 kg/hour, and the methylene chloride amount was 20.9%. The so-obtained particulate aggregate had a water content of 12% and a methylene chloride content of 18%. The obtained particulate aggregate was charged to a tower dryer having the same 3 kg/cm$^2$ steam blow-in inlet as that in Example 16, through its top portion, and after a residence time of 30 minutes, the particulate aggregate was drawn through its bottom portion. In this case, the steam amount was 300 g/minute, and 170.7% based the methylene chloride amount. The drawn particulate aggregate was moved onto a metal net, and air was blown thereto at a rate of 20 liters/minute for 5 minutes. The resultant particulate aggregate had a water content of 5% and a methylene chloride content of 0.4%. This particulate aggregate was continuously fed to the same tower dryer as that used in Example 15 through its top portion, and after a residence time of 4 hours, the particulate aggregate was drawn from its bottom portion. The hot air amount was 60 m$^3$/hour, and the thermometer inserted in the central portion of the tower showed a temperature of 165° C.

The so-obtained particulate aggregate was a particulate aggregate of the aromatic polycarbonate resin having a residual methylene chloride content of 0.4 ppm (chlorine content 0.3 ppm), a residual n-heptane content of 50 ppm, a bulk density of 0.57 g/ml, a major length/minor length ratio of 2 and a specific surface area of 1.25 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 20 μm.

Example 18

The same water slurry of a granule having a methylene chloride content of 25% as that obtained in Example 1(A) was centrifugally dehydrated to give a wet paste of an aromatic polycarbonate resin having a water content of 20% and a methylene chloride content of 23%.

The above wet paste was continuously fed to the hopper of the same twin screw extruder as that used in Example 5(C), dehydrated and finely pulverized in the extruder, and extruded to give a particulate aggregate. The feed amount of the wet paste was 45 kg/hour, and the extrusion amount was 40.3 kg/hour. The so-obtained particulate aggregate had a water content of 11% and a methylene chloride content of 19%. The organic solvent was removed from the particulate aggregate, and the particulate aggregate was centrifugally dehydrated and dried, in the same manner as in Example 1, to give a particulate aggregate of the aromatic polycarbonate resin having a residual methylene chloride content of 3.8 ppm (chlorine content 3.2 ppm), a bulk density of 0.57 g/ml, a major length/minor length ratio of 2 and a specific surface area of 0.19 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 30 μm.

Example 19

The extrusion was carried out in the same manner as in Example 18 except that water was charged to a portion below the hopper (within a block where the hopper was mounted). The feed amount of the wet paste was 45 kg/hour, and the extrusion amount was 42.4 kg/hour. In this case, the total resin amount was 30 kg/hour, and the total water amount was 30 kg/hour. The resultant particulate aggregate had a water content of 18% and a methylene chloride content of 19%. The organic solvent was removed from the particulate aggregate, and the particulate aggregate was centrifugally dehydrated and dried, in the same manner as in Example 1, to give a particulate aggregate of the aromatic polycarbonate resin having a residual methylene chloride content of 2.9 ppm (chlorine content 2.4 ppm), a bulk density of 0.56 g/ml, a major length/minor length ratio of 2 and a specific surface area of 0.24 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 30 μm.

Example 20

(H) Below the cutting machine of the same extruder as that used in Example 5(C), there were provided a steam ejector having an actuation steam tube having a diameter of 380 mm, a nozzle having a diameter of 2.2 mm, a suction chamber having a diameter of 750 mm and a diffuser having a diameter of 380 mm and a transportation tube having a diameter of 250 mm, a horizontal portion length of 6 m and a vertical portion length of 11 m.

While the same particulate aggregate as that obtained in Example 18 was continuously fed to the horizontal steam ejector of which the actuation steam pressure was set at 6 kg/cm$^2$, and transported, the organic solvent was removed. In this case, the pressure in the steam ejector suction portion was maintained at −100 mmH$_2$O by charging steam through the ejector suction portion. The particulate aggregate obtained through the transportation tube was moved onto a metal net, and air was blown thereto at a rate of 20 liters/minute. The resultant particulate aggregate had a water content of 5% and a methylene chloride content of 0.8%. This particulate aggregate was continuously fed to the same tower dryer as that used in Example 15(F) through its top portion, and after a residence time of 4 hours, the particulate aggregate was drawn from its bottom portion. The hot air amount was 60 m$^3$/hour, and the thermometer inserted in the central portion of the tower showed a temperature of 160° C. The so-obtained particulate aggregate was a particulate aggregate of the aromatic polycarbonate resin having a residual methylene chloride content of 1.2 ppm (chlorine content 1.0 ppm), a bulk density of 0.56 g/ml, a major length/minor length ratio of 2 and a specific surface area of 0.26 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 30 μm.

Example 21

The same water slurry of a granule having a methylene chloride content of 25% as that obtained in Example 1(A) was continuously charged to a roll mill, dehydrated and finely pulverized to give an aggregate. The feed amount of the slurry was 30 kg/hour, and the treatment amount was 21.2 kg/hour. The resultant aggregate had a water content of 15% and a methylene chloride content of 21%. The so-obtained aggregate was continuously fed to the same twin screw extruder as that used in Example 5 except that the kneading disk was removed, to give a particulate aggregate. The organic solvent was removed from the particulate aggregate, and the particulate aggregate was centrifugally dehydrated and dried, in the same manner as in Example 1, to give a particulate aggregate of the aromatic polycarbonate resin having a residual methylene chloride content of 3.0 ppm (chlorine content 2.5 ppm), a bulk density of 0.57 g/ml, a major length/minor length ratio of 2 and a specific surface area of 0.22 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 30 μm.

Example 22

A particulate aggregate was obtained in the same manner as in Example 21 except that the twin screw extruder was replaced with a gear pelletizer having a hole diameter of 2 mm. The organic solvent was removed from the particulate aggregate, and the particulate aggregate was centrifugally dehydrated and dried, in the same manner as in Example 1, to give a particulate aggregate of the aromatic polycarbonate resin having a residual methylene chloride content of 3.9 ppm (chlorine content 3.3 ppm), a bulk density of 0.56 g/ml, a major length/minor length ratio of 2 and a specific surface area of 0.19 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 30 μm.

Example 23

A particulate aggregate was obtained in the same manner as in Example 7 except that the twin screw extruder from which the kneading disk was removed was replaced with a gear pelletizer. The resultant aggregate was a particulate aggregate of the aromatic polycarbonate resin having a residual methylene chloride content of 3.0 ppm (chlorine content 2.5 ppm), a bulk density of 0.57 g/ml, a major length/minor length ratio of 2 and a specific surface area of 0.24 m$^2$/g, in which about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 2 to 30 μm.

Example 24

There was used a twin screw extruder having a cylinder provided with a jacket for temperature adjustment and kneading disks in the central and top end portions of the screws, which was provided with a die having 82 holes having a diameter of 2 mm each and a land length of 5 mm in the outlet of the extruder and a cutting machine (one-blade propeller having a length of 50 mm) spaced 1.5 mm away from the front surface of the die. The jacket temperature was set at 15° C., the screw rotation was set at 60 rpm, and the cutting machine rotation was set at 120 rpm. The same slurry as that obtained in Example 1(A) was continuously fed to the hopper of the extruder, dehydrated and finely pulverized in the extruder, and extruded to give a particulate aggregate. A liquid had been immediately removed from the fed slurry through a slit having a clearance of 0.2 mm, provided in the cylinder. The feed amount of the slurry was 3.6 kg/hour, the extrusion amount was 2.4 kg/hour, and the amount of water separated through the slit was 0.98 liter/hour. The resultant particulate aggregate had a water content of 12% and a methylene chloride content of 18%. The organic solvent was removed from the particulate aggregate, and the particulate aggregate was centrifugally dehydrated and dried, in the same manner as in Example 1, to give a particulate aggregate of the aromatic polycarbonate resin having a residual methylene chloride content of 2.5 ppm (chlorine content 2.1 ppm), a bulk density of 0.59 g/ml, a major length/minor length ratio of 1.33 and a specific surface area of 0.37 m$^2$/g, in which about 95% of the particulate aggregate passed through 8 mesh and all the particulate aggregate remained on 14 mesh. The particulate aggregate had an angle of repose of 18°. An aggregate particle was broken, and an electron microscopic photograph of the cross section thereof was taken at a magnification of 1,000 diameters to show that it was an aggregate formed of a fine powder of which at least 90% had a diameter of 2 to 20 μm.

Example 25

A methylene chloride solution containing 15% of an aromatic polycarbonate copolymer having a specific viscosity of 0.400, obtained by reacting bis(3,5-dibromo-4-hydroxyphenyl)propane and bisphenol A in a proportion of a bis(3,5-dibromo-4-hydroxyphenyl)propane/bisphenol A molar ratio of 2.5/7.5 with phosgene by the conventional method, was dropwise added to warm water at 55° C. with stirring, and methylene chloride was removed while the mixture was circulated through a wet method pulverizing machine, to give a water slurry having a granule concentration of 20%. This granule had a methylene chloride concentration of 15%. This slurry was fed to the hopper of the same extruder as that used in Example 1, dehydrated and finely pulverized in the extruder, and extruded to give a particulate aggregate having a water content of 11% and a methylene chloride content of 12%. The organic solvent was removed from the particulate aggregate, and the particulate aggregate was centrifugally dehydrated and dried, in the same manner as in Example 1, and the particulate aggregate was dried with a hot air circulating dryer at 135° C. (glass transition temperature 158° C.) for 6 hours to give a particulate aggregate of the aromatic polycarbonate resin having a residual methylene chloride content of 35 ppm (chlorine content 29 ppm), a bulk density of 0.57 g/ml, a major length/minor length ratio of 2 and a specific surface area of 0.13 m$^2$/g, in which at least about 95% of the particulate aggregate passed through 8 mesh and all the particulate aggregate remained on 14 mesh. The particulate aggregate had an angle of repose of 16°. An aggregate particle was broken, and an electron microscopic photograph of the cross section thereof was taken at a magnification of 1,000 diameters to show that it was an aggregate formed of a fine powder of which at least 90% had a diameter of 5 to 35 μm.

Comparative Example 1

The same water slurry of an aromatic polycarbonate resin as that obtained in Example 1 was pulverized with a hammer mill with a screen having an opening of 5 mm. Then, the organic solvent was removed from the resultant product, and the product was centrifugally dehydrated and dried, in the same manner as in Example 1, to give an aromatic polycarbonate resin granule having a residual methylene chloride content of 93 ppm (chlorine content 78 ppm), a residual carbon tetrachloride content of 25 ppm, a bulk density of 0.61 g/ml and a specific surface area of 0.02 m$^2$/g. The granule had an angle of repose of 36°. The granule was observed through an electron microscope at a magnification of 1,000 diameters to show that it was not an aggregate of a fine powder.

Comparative Example 2

The same water slurry of an aromatic polycarbonate resin granule at that obtained in Example 13(E) was fed to an extruder in the same manner as in Example 1, but it was difficult to extrude the slurry.

We claim:

1. An aromatic polycarbonate resin granule, wherein
   (a) the granule is formed of particles of a fine powder,
   (b) the granule has a specific surface area of 0.05 to 2.0 m²/g,
   (c) the granule has a bulk density of 0.4 to 0.8 g/ml,
   (d) the granule has an average particle diameter within the range of 0.2 to 5 mm,
   (e) at least 90% of the fine powder particles forming the granule have a particle diameter of 50 μm or less, and
   (f) the content of a halogenated hydrocarbon as an organic solvent in the granule is 50 ppm or less in terms of a halogen amount.

2. The granule of claim 1, wherein the granule has an angle of repose of 10° to 34°.

3. The granule of claim 1, wherein the granule has a major length/minor length ratio of 1–10.

4. The granule of claim 1, wherein the granule has a specific surface area of 0.07 to 2.0 m²/g.

5. The granule of claim 1, wherein the granule has a bulk density of 0.45 to 0.75 g/ml.

6. The granule of claim 1, wherein the granule has a uniform particle size and an average particle diameter of 0.4 to 4 mm.

7. The granule of claim 1, wherein at least 90% of the fine powder forming the granule has a particle diameter of 40 μm or less.

8. The granule of claim 1, wherein the content of a halogenated hydrocarbon as an organic solvent is 40 ppm or less in terms of a halogen amount.

9. The granule of claim 1, wherein the granule has an angle of repose of 13° to 33°.

10. The granule of claim 1, wherein the aromatic polycarbonate resin is a product obtained by a solution method.

11. The granule of claim 1, wherein at least 90% of the fine powder particles forming the granule have a particle diameter of 0.3 to 30 μm.

12. The granule of claim 1, wherein the aggregate granule particles have a uniform size within the range of 0.5 to 3 mm.

13. The granule of claim 1, wherein the halogen content of the aggregate granule particles is 4.0 ppm or less.

14. The granule of claim 1, wherein the aggregate granular particles have a specific surface area of 0.07 to 2.0 m²/g and a bulk density of 0.45 to 0.75 g/ml.

15. An aromatic polycarbonate resin granule, wherein
   (a) the granule is formed of particles of a fine powder,
   (b) the granule has a specific surface area of to 2.0 m²/g,
   (c) the granule has a bulk density of 0.4 to 0.8 g/ml,
   (d) the granule has a uniform particle size and an average particle diameter within the range of 0.4 to 4 mm,
   (e) at least 90% of the fine powder forming the granule have a particle diameter of 40 μm or less,
   (f) the content of a halogenated hydrocarbon as an organic solvent in the granule is 40 ppm or less in terms of a halogen amount, and
   (g) the granule has an angle of repose of 10° to 34°.

16. The granule of claim 15, wherein the granule has an angle of repose of 13° to 25°.

17. The granule of claim 15, wherein at least 90% of the fine powder particles have a particle diameter of 0.3 to 30 μm.

18. The granule of claim 15, wherein the (c) aggregate granule particles have a uniform size within the range of 0.4 to 3 mm.

19. The granule of claim 15, wherein the (d) halogen content of the aggregate granule particles is 4.0 ppm or less.

20. The granule of claim 15, wherein the aromatic polycarbonate resin is a product obtained by a solution method.

* * * * *